UNITED STATES PATENT OFFICE 2,441,934

OXYGEN ANALOG OF BIOTIN AND PROCESS OF MAKING SAME

Robert Duschinsky, Essex Fells, N. J., assignor to Hoffmann-La Roche, Inc., Nutley, N. J., a corporation of New Jersey No Drawing. Application July 30, 1945, Serial No. 607,916

3 Claims. (Cl. 260—309)

My invention relates to a novel chemical compound, and to a method for its synthesis.

An object of my invention is to prepare dl-2'-keto-3,4 - imidazolido - tetrahydrofurane - (2) -n-valeric acid, an oxygen analog of biotin, and having the formula

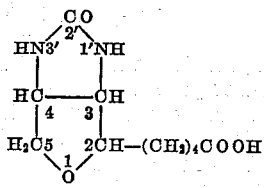

This biotin analog exhibits growth-promoting activity for bacteria and yeast, such as *Lactobacillus arabinosus*, *Lactobacillus casei*, and *Saccharomyces cerevisiae*. It also shows vitamin activity, snce it is able to cure biotin deficiency in rats.

This application is a continuation-in-part of my copending applications Serial No. 607,915, filed July 30, 1945, and Serial No. 533,396, now U. S. Patent No. 2,397,250, filed April 29, 1944.

The compound, dl-2'-keto - 3,4 - imidazolido-tetrahydrofurane-(2)-n-valeric acid, may be prepared according to the following scheme:

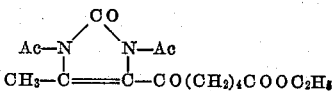

(Diacetyl-4-methyl-5-imidazolone-(2)-ε-keto-caproic acid ethyl ester)

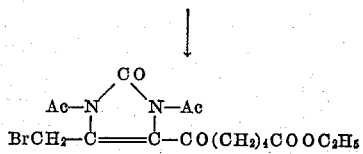

(Diactyl-4-bromomethyl-5-imidazolone-(2)-ε-keto caproic acid ethyl ester)

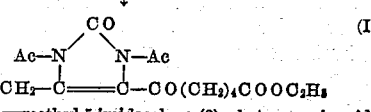

(Diacetyl-4-acetoxymethyl-5-imidazolone-(2)-ε-keto-caproic acid ethyl ester)

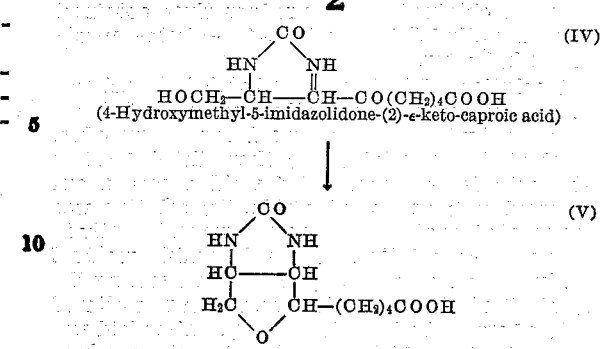

(dl-2'-keto-3,4-imidazolido-tetrahydrofurane-(2)-n-valeric acid)

Intermediate Compound III can be prepared by the following synthesis:

34 g. 4-methyl-5-imidazolone-(2)-carboxylic acid ethyl ester were dissolved in 215 cc. of 0.93 N sodium hydroxide (1 mol) and the solution kept 68 hours at 50°–55°. After cooling it was neutralized to pH 7 by gradual addition of 37.5 cc. of 5 N hydrochloric acid, which was accompanied by much carbon dioxide evolution and crystallization of the reaction product. The mixture was stirred in an ice bath for one hour, the methyl-imidazolone filtered off and washed chlorine-free with some ice cold water. After drying in an oven at 60°, a first crop of 6.6 g. was obtained. M. P. 184°–192° C.

The mother-liquor was concentrated in vacuo, while the pH, which had the tendency to increase, was adjusted to 7 by gradual addition of 7 cc. N hydrochloric acid, and was finally brought to dryness. The white residue was extracted three times with 35 cc. of boiling absolute ethanol, and once with 95% ethanol. The alcoholic extracts, after separation from the undissolved sodium chloride, were concentrated to dryness, thus yielding a second crop of 8.55 g. methyl-imidazolone melting at ca. 178° C.

The total yield was 15.15 g. The crude material was directly used for the next step.

Sometimes the first crop of reaction product did not crystallize directly, but only after partial concentration of the solution in vacuo.

To obtain a pure sample, the substance was twice recrystallized from 2 volumes of boiling water. M. P. 202.5°–204.5° C. (after softening at 190° C.). For the analysis it was sublimed at 1 mm. (200° C. bath).

The product was 4-methyl-imidazolone-2.

5.46 g. of 4-methyl-imidazolone-2 were suspended in 50 cc. of nitrobenzene. 11.1 g. (1.04 mol) of adipic acid mono-ethyl ester chloride were added, and the mixture stirred well in a three-neck flask fitted with an airtight mechanical stirrer and ascending condenser. With cooling in an ice bath, 15 g. (2 mols) of anhydrous aluminum chloride were added, which readily went into solution, accompanied by heat evolution. Then, with continuous stirring, the temperature was raised to 60°–65° C. and maintained there for five hours. At that time, the evolution of hydrochloric acid had completely stopped.

The reaction mixture was a brown, viscous liquid. It was treated with 50 g. of crushed ice and 100 cc. of ether, whereupon yellowish crystals separated which were washed chlorine- and nitrobenzene-free with water and ether. After drying at 100° in vacuo, 7.67 g. of the reaction product were obtained. M. P. 170° C. By recrystallization in 75 cc. of 50% ethanol, with addition of activated carbon, 6.73 g. of crystals, M. P. 171.5°–173° C., were obtained. The product thus obtained was 4-methyl-5-imidazolone-(2)-ε-keto-caproic acid ethyl ester.

A solution of 50.8 g. 4-methyl-5-imidazolone-(2)-ε-keto-caproic acid ethyl ester in 200 cc. acetic anhydride was refluxed for 20 minutes. Most of the anhydride was then distilled off at atmospheric pressure. The residue was again refluxed with acetic anhydride, the solution was evaporated at atmospheric pressure and finally in vacuo. The solution of the brownish residual oil in 100 cc. ethanol deposited upon cooling the crystallized diacetyl derivative, which was filtered off and washed with cold ethanol. The yield was 56 g. M. P. 69.5°–70.5°. The alcoholic motherliquor gave upon concentration and refluxing the residue again with 25 cc. of acetic anhydride, a second crop of diacetyl-keto-ester, which was distilled at 0.6 mm. and 165° (bath temperature). It weighed 1.5 g.

This gave Product I, which is diacetyl-4-methyl-5-imidazolone-(2) - ε - keto-caproic acid ethyl ester.

A solution in 165 cc. of carbon tetrachloride, of 50.7 g. diacetyl-4-methyl-5-imidazolone-(2)-ε-keto caproic acid ethyl ester, was refluxed with 26.5 g. N-bromosuccinimide, until a sample of the mixture applied on moistened iodine starch paper gave no iodine coloration. As a rule the reaction was completed after 40 to 60 minutes. The cooled solution, filtered from the succinimide, gave, upon evaporation in vacuo, a crystalline mass, which was melted by warming on a water bath, and poured into 150 cc. of ether. Matted needles separated, which were washed with about 100 cc. ether. The yield was 56 g. M. P. 75°–76.5°. The product is quite soluble in benzene, dioxane, ethyl acetate, and acetic acid; less in ether and alcohol; insoluble in petroleum ether. It can be recrystallized from alcohol.

This gave Product II, which is diacetyl-4-bromomethyl-5-imidazolone-(2)-ε-keto-caproic acid ethyl ester.

To a solution of 4.42 g. of this diacetyl-bromoethyl keto ester, in 50 cc. acetic acid, were added 1.77 g. of silver acetate, with stirring and heating to 55°, until the solution contained neither silver nor bromine ions. After separation from the silver bromide, the solution was evaporated and the almost colorless residue dried in vacuo at 100°. The yield was 3.5 to 3.8 g.; $n_D^{24}$=1.4507.

The product corresponds to Formula III, diacetyl - 4 - acetoxymethyl - 5 - imidazolone-(2)-ε-keto-caproic acid ethyl ester.

In the conversion of Compound III to Compound IV, nuclear hydrogenation is first carried out, followed by saponification, with an alkaline material such as barium hydroxide. This hydrogenation and saponification converts the imidazolone Compound III in the imidazolone Compound IV.

Compound IB is then hydrogenated, whereby the keto group (=C=O) is converted to a secondary alcohol group (=CHOH), followed by intramolecular anhydrization, with the loss of one molecule of water, to form the furane Compound V.

An illustrative example for carrying out this synthesis is given, which will serve as a guide to those skilled in the art.

*Example*

A solution of 17.3 g. of diacetyl-4-acetoxymethyl-5-imidazolone-(2)-ε-keto - caproic acid ethyl ester, in 70 cc. of ethylacetate, was hydrogenated in the presence of 18.9 g. of a catalyst containing 2.5% palladium on activated carbon at a pressure of 2000 lbs. and 60° C. for for 15 hours. The catalyst was filtered off and extracted three times with 100 cc. of boiling ethylacetate. The filtrate and the three extracts were combined and evaporated to yield 13.6 g. of a light yellow oil.

The hydrogenation was completed in acetic acid using either platinum oxide or palladium on activated carbon as a catalyst. Thus 9.6 g. of the oil, dissolved in 50 cc. of acetic acid were hydrogenated at room temperature in the presence of 5.8 g. of a prehydrogenated catalyst containing 10% palladium on activated carbon. After an uptake of 162 cc. of hydrogen in five hours, the hydrogenation was practically completed. The catalyst was filtered off and the solution evaporated in vacuo to yield 9.3 g. of oil, which was freed from acetic acid by drying over sodium hydroxide. This substance was dissolved in 60 cc. of ethanol, and saponified by the addition of 325 cc. 0.5 N barium hydroxide solution. After 1½ hours, the barium was precipitated with the equivalent amount of 1 N sulfuric acid.

The barium sulfate was filtered off, the filtrate was concentrated in vacuo to a sirup, treated with dioxane, and the solution distilled off in vacuo. This was repeated. The final residue was twice extracted with 20 cc. of boiling dry dioxane and twice with 20 cc. of boiling alcohol.

The dioxane and alcohol solutions deposited, on cooling, almost colorless needles, which were washed with dioxane and ether. By concentration, a second crop was obtained. M. P. ca. 140°.

A solution of 244 mg. of the hydroxy keto acid (IV), thus obtained, in 10 cc. of acetic acid, which had been previously distilled over chromium trioxide, was hydrogenated at room temperature and atmospheric pressure in the presence of 100 mg. of prehydrogenated platinum oxide catalyst. After 23 hours, the theoretical amount of 24 cc. of hydrogen was absorbed. The catalyst was filtered off and the solution evaporated in vacuo, leaving 230 mg. of a crystalline residue. Recrystallization from 2 cc. of ethanol yielded 100 mg. of colorless needles, melting at ca. 200°. Two recrystallizations from ethanol raised the melting point to 205°–206°. This proved to be dl-2'-keto- 3,4-imidazolido-tetrahydrofurane-(2)-n-valeric acid.

It will be understood that the claims are intended to cover all tautomeric forms.

What I claim is:

1. The compound having the following structural formula:

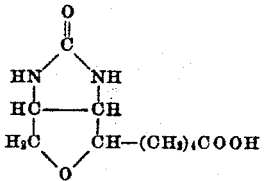

2. A method of preparing dl-2'-keto-3,4-imidazolido-tetrahydrofurane-(2)-n-valeric acid, which comprises hydrogenating a compound of the formula

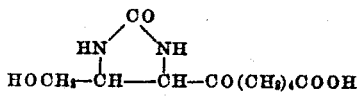

to obtain

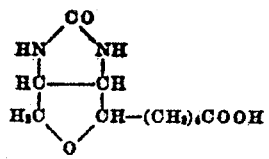

3. A process conforming to claim 2 wherein the resultant dl-2'-keto-3,4-imidazolido-tetrahydrofurane-(2)-n-valeric acid is isolated.

ROBERT DUSCHINSKY.

REFERENCES CITED

The following references are of record in the file of this patent:

Journal American Chem. Soc., vol. 67, April 1945, page 694.